(12) United States Patent
Wortel et al.

(10) Patent No.: US 9,608,481 B2
(45) Date of Patent: Mar. 28, 2017

(54) INDUCTIVE POWER SUPPLY

(71) Applicant: NXP B.V., Eindhoven (NL)

(72) Inventors: Klaas Wortel, Eindhoven (NL); Johan Somberg, Wijchen (NL); Tarik Naass, Best (NL)

(73) Assignee: NXP B.V., Eindhoven (NL)

( * ) Notice: Subject to any disclaimer, the term of this patent is extended or adjusted under 35 U.S.C. 154(b) by 423 days.

(21) Appl. No.: 14/300,974

(22) Filed: Jun. 10, 2014

(65) Prior Publication Data

US 2015/0357825 A1    Dec. 10, 2015

Related U.S. Application Data

(60) Provisional application No. 62/009,890, filed on Jun. 9, 2014.

(51) Int. Cl.
*H01F 27/42* (2006.01)

(52) U.S. Cl.
CPC .............. *H02J 50/60* (2016.02); *H02J 50/12* (2016.02)

(58) Field of Classification Search
CPC .................................. H02J 50/60; H02J 50/12
USPC ........................................................ 307/104
See application file for complete search history.

(56) References Cited

U.S. PATENT DOCUMENTS

| 2010/0055928 A1* | 3/2010 | Randall .................. G06F 1/1632 439/1 |
| 2013/0069442 A1* | 3/2013 | Kim ........................ H02J 5/005 307/104 |
| 2014/0197693 A1* | 7/2014 | Fujita ...................... H02J 7/025 307/104 |
| 2015/0084586 A1* | 3/2015 | Von Novak, III ...... H02J 7/025 320/108 |

OTHER PUBLICATIONS

"Qi (Inductive Power Standard"; retrieved from the internet http://en.wikipedia.org/wiki/Qi_(inductive_power_standard) on Jun. 9, 2014 5 pages.

* cited by examiner

*Primary Examiner* — Jared Fureman
*Assistant Examiner* — Duc M Pham
(74) *Attorney, Agent, or Firm* — Rajeev Madnawat

(57) ABSTRACT

One example discloses an inductive power supply device, comprises: an inductive coupler including a resonant circuit having a first resonant state in response to an object at a first distance from the inductive power supply, and a second resonant state in response to the object at a second distance from the inductive power supply; a driver circuit coupled to send a first power-level to the inductive coupler when in a charge-object state and to send a second power-level to the inductive coupler when in a detect-object state, wherein the second power-level is less than the first power-level; and an object detector coupled to detect the first and second resonant states and place the driver circuit in the charge-object state in response to the first resonant state, and place the driver circuit in the detect-object state in response to the second resonant state.

15 Claims, 15 Drawing Sheets

PEAK DETECTOR

| DESCRIPTION | MIN | TYP | MAX | UNIT |
|---|---|---|---|---|
| SUPPLY VOLTAGE | | 1.8 | | V |
| SUPPLY CURRENT CONSUMPTION | 0 | | 20 | uA |
| INPUT VOLTAGE RANGE | | | 500 | mV |
| OFFSET (NOT CRITICAL) | -10 | | 10 | mV |
| GAIN BW | 1 | 2 | | MHz |
| CURRENT SOURCE CAPABILITY | 0.8 | 1 | 1.2 | uA |
| CURRENT SINK CAPABILITY | | 0 | | uA |
| CAPACITOR LOAD CONDITION | 0.8 | 1 | 1.2 | pF |

SWITCH S1, S2, S3

| DESCRIPTION | MIN | TYP | MAX | UNIT |
|---|---|---|---|---|
| SUPPLY VOLTAGE | | 1.8 | | V |
| ENABLE ON VOLTAGE | 2/3 Vdd | | | V |
| ENABLE OFF VOLTAGE | | | 1/3Vdd | V |
| ON RESISTANCE | | | 1 | kohm |
| OFF RESISTANCE | 100 | | | Gohm |

FIG. 10

CAPACITOR

| DESCRIPTION | MIN | TYP | MAX | UNIT |
|---|---|---|---|---|
| PEAK DETECTOR CAPACITOR VALUE C1 | | 1 | | pF |
| HOLD CAPACITOR C2, FIXED PORTION | | 0.2 | | pF |
| HOLD CAPACITOR C2, VARIABLE PORTION | | | | |
| capsel<0> | | 0.2 | | pF |
| capsel<1> | | 0.4 | | pF |
| capsel<2> | | 0.8 | | pF |
| capsel<3> | | 2.2 | | pF |

COMPARATOR

| DESCRIPTION | MIN | TYP | MAX | UNIT |
|---|---|---|---|---|
| SUPPLY VOLTAGE | | 1.8 | | V |
| SUPPLY CURRENT CONSUMPTION | | | 20 | uA |
| INPUT VOLATAGE RANGE | 0 | | 500 | mV |
| OFFSET (SOMEWHAT CRITICAL) | -2 | | 2 | mV |
| GAIN | 60 | | | dB |
| PROP DELAY | | 10 | | ns |

FIG. 11

| C3-CAPACITOR SELECT (CAPSEL) | CAP RATIO | R-DAMPING 0.3ohm | R-DAMPING 0.6ohm | R-DAMPING 1ohm | R-DAMPING 2ohm |
|---|---|---|---|---|---|
| 0 | 1 : 0.2 = 83% | 1 | 1 | 1 | 1 |
| 1 | 1 : 0.4 = 71% | 0 | 1 | 1 | 1 |
| 2 | 1 : 0.6 = 63% | 0 | 1 | 1 | 1 |
| 3 | 1 : 1.0 = 50% | 0 | 0 | 1 | 1 |
| 4 | 1 : 1.4 = 42% | 0 | 0 | 0 | 1 |
| 5 | 1 : 2.2 = 31% | 0 | 0 | 0 | 1 |
| 6 | 1 : 3.8 = 21% | 0 | 0 | 0 | 1 |

FIG. 12

INDUCTIVE POWER SUPPLY

REFERENCE TO PROVISIONAL APPLICATION TO CLAIM PRIORITY

A priority date for this present U.S. patent application has been established by prior U.S. Provisional Patent Application, Ser. No. 62/009,890, entitled INDUCTIVE POWER SUPPLY, filed on Jun. 9, 2014 by inventors Wortel et al., and commonly assigned to NXP B.V. of Eindhoven, Netherlands.

BACKGROUND

Brief Background Introduction

This specification relates generally to devices, apparatus, systems, articles and control instructions for a wireless power supply.

SUMMARY

An example inductive power supply device, comprises: an inductive coupler including a resonant circuit having a first resonant state in response to an object at a first distance from the inductive power supply, and a second resonant state in response to the object at a second distance from the inductive power supply; a driver circuit coupled to send a first power-level to the inductive coupler when in a charge-object state and to send a second power-level to the inductive coupler when in a detect-object state, wherein the second power-level is less than the first power-level; and an object detector coupled to detect the first and second resonant states and place the driver circuit in the charge-object state in response to the first resonant state, and place the driver circuit in the detect-object state in response to the second resonant state.

An example article of manufacture comprises at least one non-transitory, tangible machine readable storage medium containing executable machine instructions for inductive power supply which comprises: an inductive coupler including a resonant circuit having a first resonant state in response to an object at a first distance from the inductive power supply, and a second resonant state in response to the object at a second distance from the inductive power supply; instructions for sending a first power-level to the inductive coupler when in a charge-object state; instructions for sending a second power-level to the inductive coupler when in a detect-object state, wherein the second power-level is less than the first power-level; and instructions for detecting the first and second resonant states; instructions for placing the inductive power supply in the charge-object state in response to the first resonant state, and instructions for placing the inductive power supply in the detect-object state in response to the second resonant state.

An example wireless power transmitter comprises: an inductive coupler including an LC tank circuit having a first Q-Factor in response to an object at a first distance from the wireless power transmitter, and a second Q-Factor in response to the object at a second distance from the wireless power transmitter; a driver circuit coupled to send a charging power-level to the inductive coupler when in a charge-object state and to send a standby power-level to the inductive coupler when in a detect-object state, wherein the standby power-level is less than the charging power-level; a controller capable of causing the driver circuit to ping the resonant circuit; a sampling circuit capable of sampling amplitude peaks in a transient response of the resonant circuit in response to the ping; a first capacitor capable of storing a charge corresponding to a first amplitude peak; a second capacitor capable of storing a charge corresponding to a second amplitude peak; a comparator capable of distinguishing between the first and second Q-Factors based on a comparison of the first amplitude peak and the second amplitude peak stored in the capacitors; and wherein the controller is capable of placing the driver circuit in the charge-object state in response to the LC tank circuit having the first Q-Factor, and placing the driver circuit in the detect-object state in response to the LC tank circuit having the second Q-Factor.

The above summary is not intended to represent every example embodiment within the scope of the current or future Claim sets. Additional example embodiments are discussed within the Figures and Detailed Description below.

BRIEF DESCRIPTION OF THE DRAWINGS

FIG. 10 is a first example table of a set of operational parameters for illustrative example inductive power supply.

FIG. 11 is a second example table of a set of operational parameters for illustrative example inductive power supply.

FIG. 12 is a third example table of a set of operational parameters for illustrative example inductive power supply.

Figure 1:
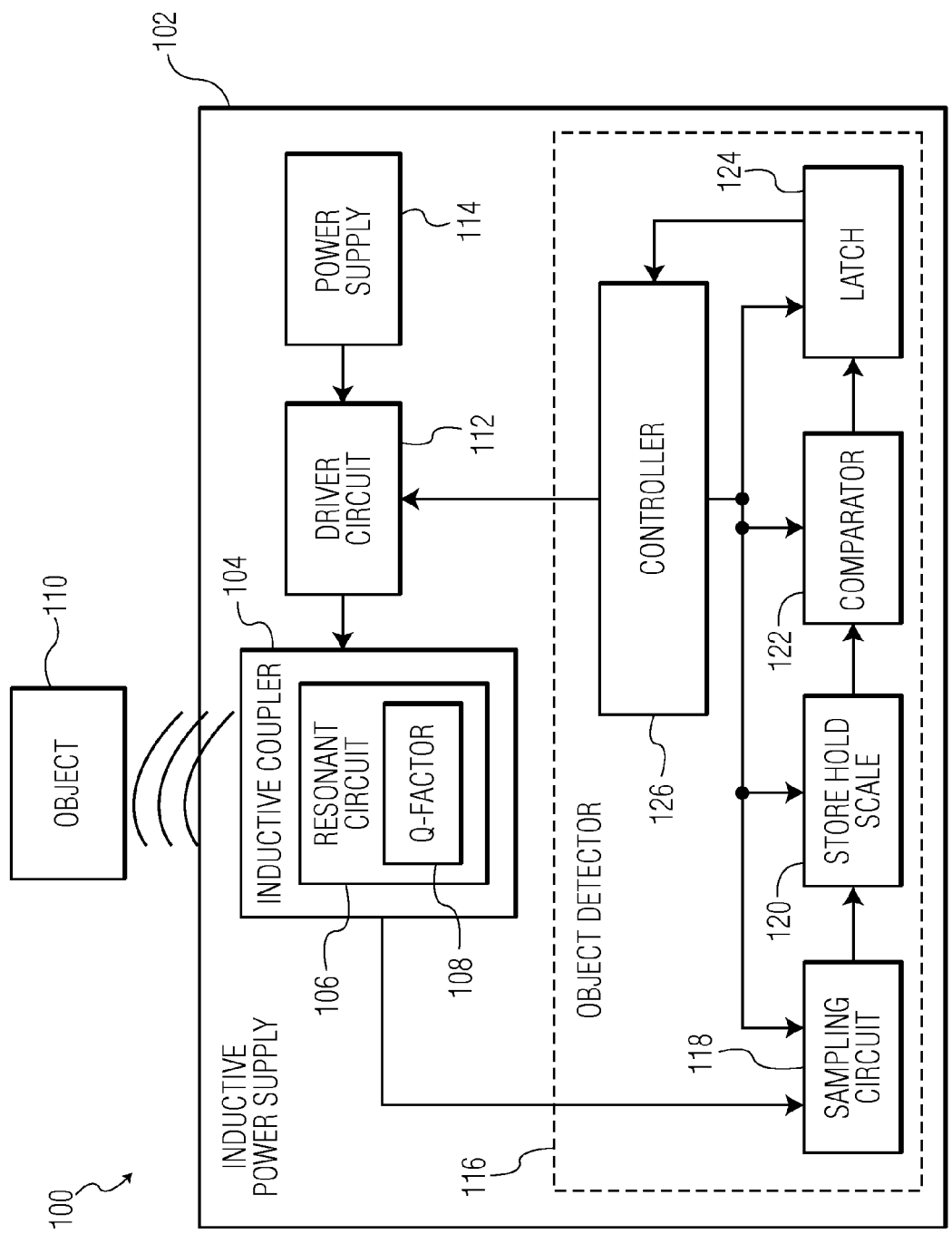
FIG. 1 is an example inductive power supply.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Some wireless charging devices continuously scan for presence of an object, such as a smartphone, before opening a communication-link with and charging the object. These scanning systems can include a high-power digital communications processor which is continually on. Since the wireless charging devices continuously scan objects, scanning power consumption can be significant even though such wireless charging devices actually charge the objects for only a short portion of a typical day.

Scanning for objects need not consume as much power as the digital communications processor if an alternative circuit for detecting objects could be used. An analog circuit is discussed herein which in one example monitors how a Quality Factor (i.e. Q Factor) of a resonant circuit in an inductive power supply (e.g. a wireless charging device) varies in the presence or absence of an object within a predetermined distance from the wireless charging device.

The Q Factor is a dimensionless parameter that describes how under-damped or over-damped a resonant circuit is. A higher Q Factor indicates a lower rate of energy loss relative to the stored energy of the resonant circuit (i.e. the resonator's oscillations die out more slowly since such resonators have low damping, thus they ring longer after being pinged with energy). A lower Q Factor indicates a higher rate of energy loss relative to the stored energy of the resonant circuit (i.e. the resonator's oscillations die out more quickly since such resonators have high damping, thus they ring for a shorter period of time after being pinged with energy).

Such an analog circuit need not operate continuously but could ping the resonant circuit (i.e. an power pulse is electrically sent to the resonant circuit) from time to time to detect a presence of the object. Such analog circuit in another example would only wake-up the high-power digital communication processor and inductive charging device when an object is actually detected. The remaining time the wireless charging device would remain in a quiescent/idle state. Such a wireless charging device would consume less power than one which keeps the communications processor on continuously. More details are now discussed.

FIG. 1 is an example 100 inductive power supply 102. The inductive power supply 102, includes an inductive coupler 104, a driver circuit 112, a power supply 114 and an object detector 116.

The inductive coupler 104 includes a resonant circuit 106 having a first resonant state when an object 110 is at a first distance from the inductive power supply 102, and a second resonant state when the object 110 is at a second distance from the inductive power supply 102. In an example embodiment the inductive coupler 104 includes a power transmission pad having an inductive coil; and the object 110 is either a smartphone, a wearable device, a medical device, or any sort of wirelessly powered device.

Figure 8:
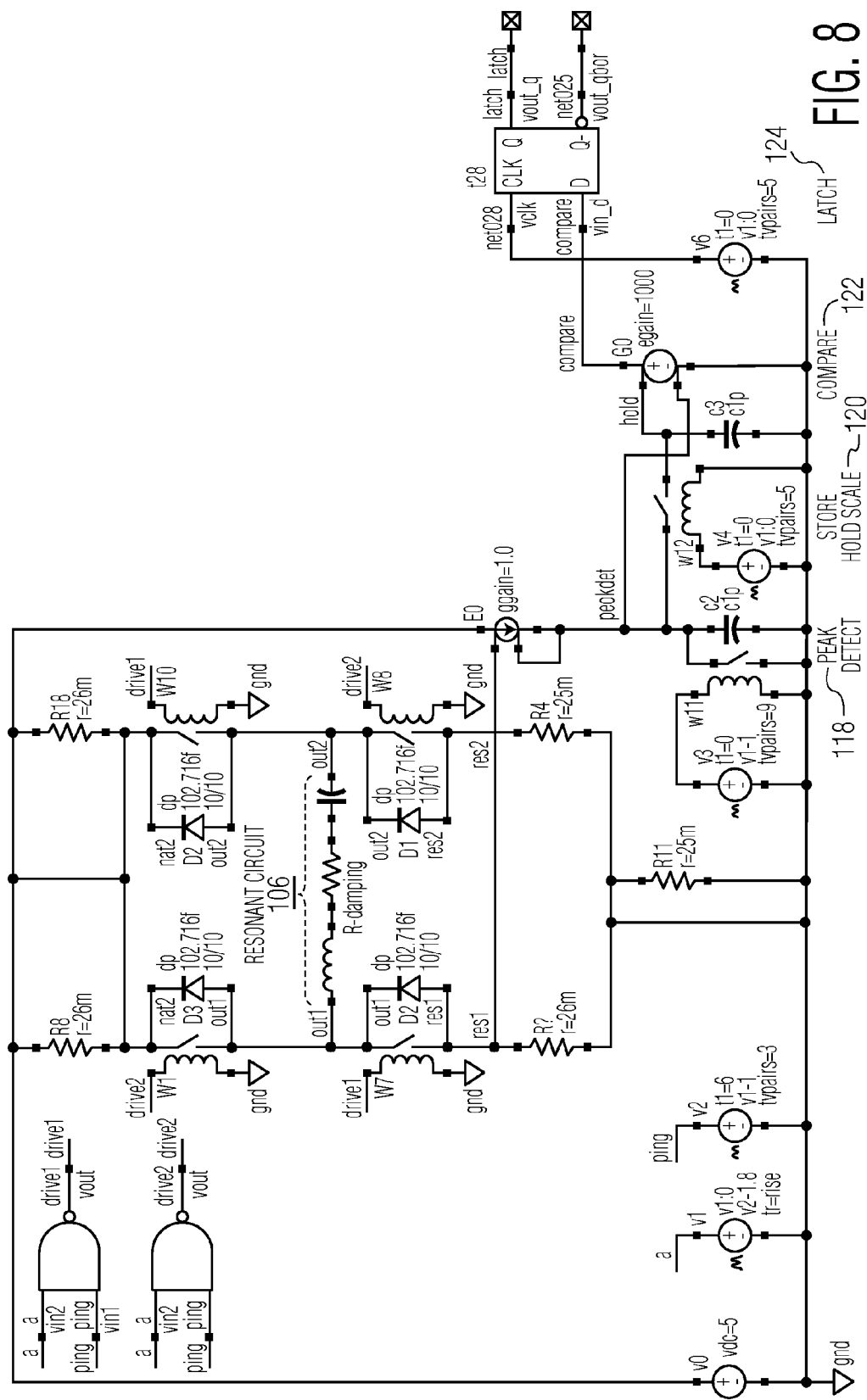
FIG. 8 is an example of circuit diagram of a portion of the inductive power supply.

In one example the resonant circuit 106 is an LC tank circuit (e.g. an inductor-capacitor circuit, such as shown in FIG. 8), having a Q-Factor 108. In such an embodiment the first resonant state would correspond to a first Q-Factor 108 when the object 110 is present (see FIG. 2), and the second resonant state would correspond to a second Q-Factor 108 when the object 110 is not present (see FIG. 3).

The driver circuit 112 sends a first power-level, from the power supply 114, to the inductive coupler 104 when placed in a charge-object state, and sends a second power-level to the inductive coupler 104 when placed in a detect-object state. In one example, the first power-level is a high-power level for wirelessly charging objects 110, and the second power-level is a low-power level when no objects 110 are present but the inductive power supply 102 is scanning for a next object 110 to come within range.

The object detector 116 detects the first and second resonant states and places the driver circuit 112 in the charge-object state when the first resonant state of the resonant circuit 106 is detected, and places the driver circuit 112 in the detect-object state when the second resonant state of the resonant circuit 106 is detected.

As an object 110 moves closer to the resonant circuit 106 (e.g. a tank circuit), the quality factor (Q) of the wireless power supply 114 will decrease. At a predetermined distance between the object 110 and the inductive power supply 102, the Q-Factor 108 falls below a predetermined level, and in response, the object detector 116 wakes up the high power communication processor to begin powering and/or charging the object 110. The predetermined Q-Factor 108 level, below which an object 110 is deemed to be detected, can be selected during calibration depending upon the type of objects 110 to be powered and/or charged.

So that the inductive power supply 102 can charge more than one object 110, one example of the object detector 116 places the driver circuit 112 in both the charge-object state and the detect-object state at the same time.

The object detector 116 includes: a sampling circuit 118 (e.g. a peak detector); a detector circuit which includes a store-hold-scale circuit 120, a comparator 122 and a latch 124; and a controller 126 (e.g. a state machine).

The controller 126 is capable of causing the driver circuit 112 to ping the resonant circuit 106. Pinging is herein defined as sending a pulse of power, energy, voltage, current, etc. electrically transmitted to the resonant circuit 106. It is analogous to "ringing" a bell by imparting energy to the bell with a rod. See FIGS. 2 and 3 for example graphs of the electrical response of the resonant circuit 106 in response to a ping pulse when the object 110 is present and when the object 110 is not present.

The sampling circuit 118 is capable of sampling a transient response of the resonant circuit 106 in response to the ping.

The detector circuit (120, 122, 124) distinguishes the first and second resonant states of the resonant circuit 106 based on a comparison between a first sample and a second sample of the transient response.

Figure 4:
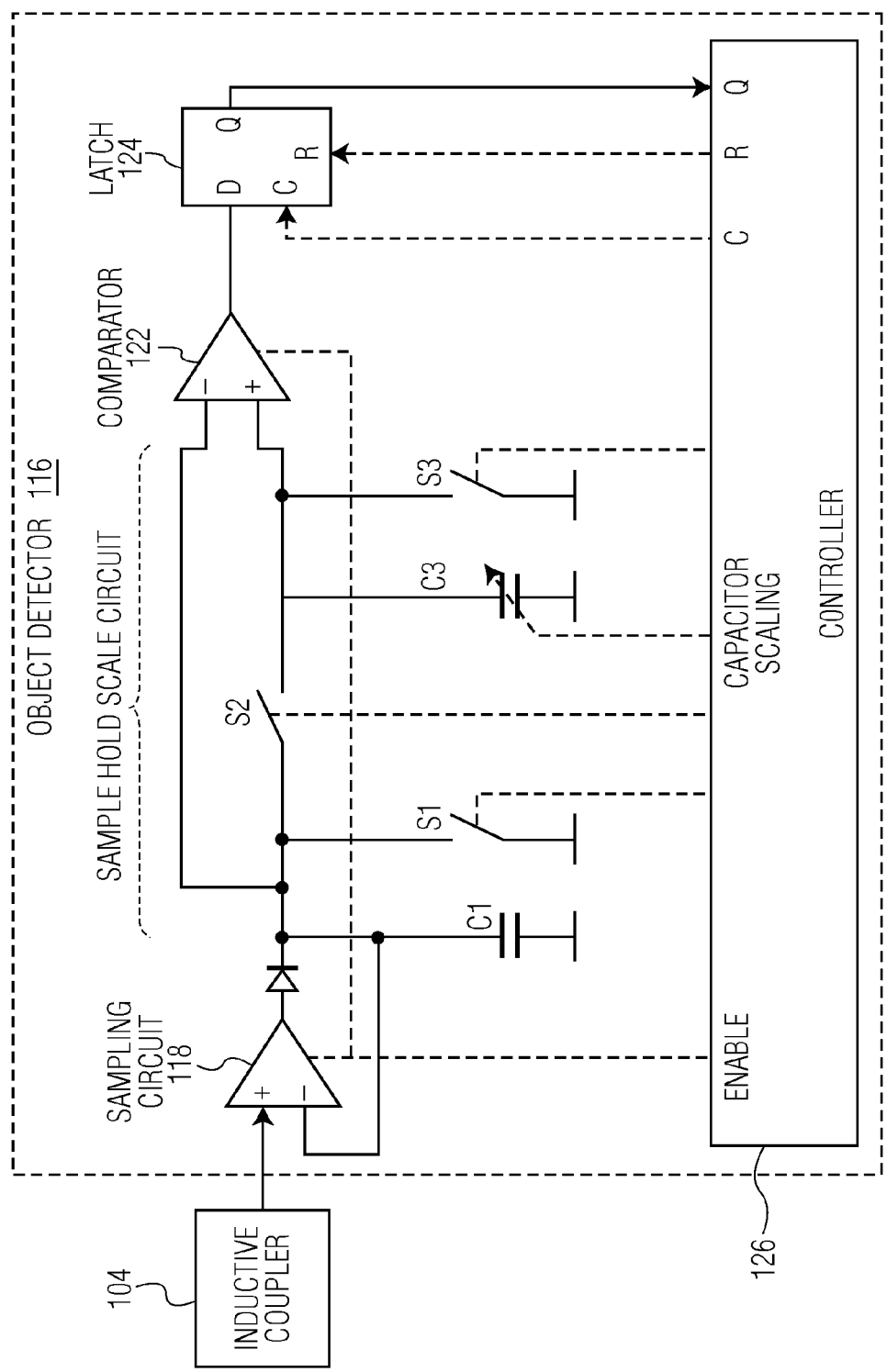
FIG. 4 is an example object presence detector within the inductive power supply.
Figure 5:
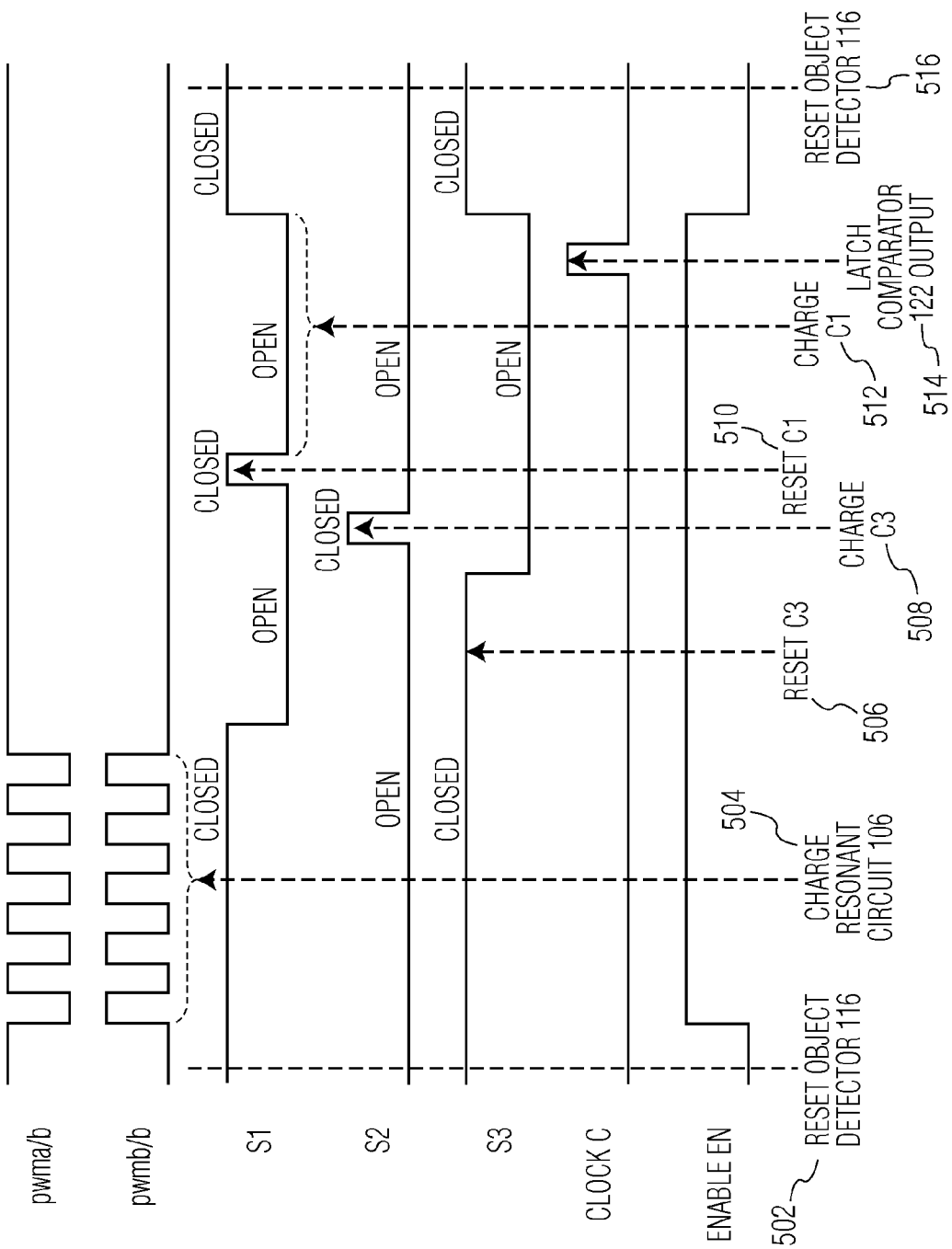
FIG. 5 is an example timing diagram of the object presence detector.

In one example, the first sample is a first peak and the second sample is a second peak in the transient response. In some examples, the first resonant state (i.e. object 110 present) corresponds to a scaled amplitude of the first sample that is greater than an amplitude of the second sample; and the second resonant state (i.e. object 110 not present) corresponds to a scaled amplitude of the first sample that is less than an amplitude of the second sample. FIGS. 4 and 5 discussed below provide a specific example electrical circuit and timing diagram for the detection circuit.

In one example the detect-object state includes a ping state, a listen state, and an idle state. In the ping state, the driver circuit 112 pings the resonant circuit 106. In the listen state the sampling circuit 118 samples the transient response of the resonant circuit 106. In the idle state the driver circuit 112 does not send pings to the resonant circuit 106, thus saving power. In the detect-object state any communications processor is put into a low-power state. Once an object 110 is detected and the charge-object state is entered, the communications processor can be put into a higher-power state.

Another example embodiment of the inductive power supply 102 is a wireless power transmitter. The wireless power transmitter includes: an inductive coupler 104, a driver circuit 112, a controller 126, a sampling circuit 118, a first capacitor, a second capacitor, and a comparator 122.

The inductive coupler 104 includes an LC tank circuit 106 having a first Q-Factor 108 in response to an object 110 at a first distance from the wireless power transmitter, and a second Q-Factor 108 in response to the object 110 at a second distance from the wireless power transmitter. The driver circuit 112 sends a charging power-level to the inductive coupler 104 when in a charge-object state and to send a standby power-level to the inductive coupler 104 when in a detect-object state, wherein the standby power-level is less than the charging power-level.

The controller 126 is capable of causing the driver circuit 112 to ping the resonant circuit; and, the sampling circuit 118 is capable of sampling amplitude peaks in a transient response of the resonant circuit in response to the ping. The first capacitor is capable of storing a charge corresponding to a first amplitude peak; and, the second capacitor is capable of storing a charge corresponding to a second amplitude peak.

The comparator 122 is capable of distinguishing between the first and second Q-Factors 108 based on a comparison of the first amplitude peak and the second amplitude peak stored in the capacitors. The controller 126 is also capable of placing the driver circuit 112 in the charge-object state in response to the LC tank circuit 106 having the first Q-Factor 108, and placing the driver circuit 112 in the detect-object state in response to the LC tank circuit 106 having the second Q-Factor 108.

Figure 2:
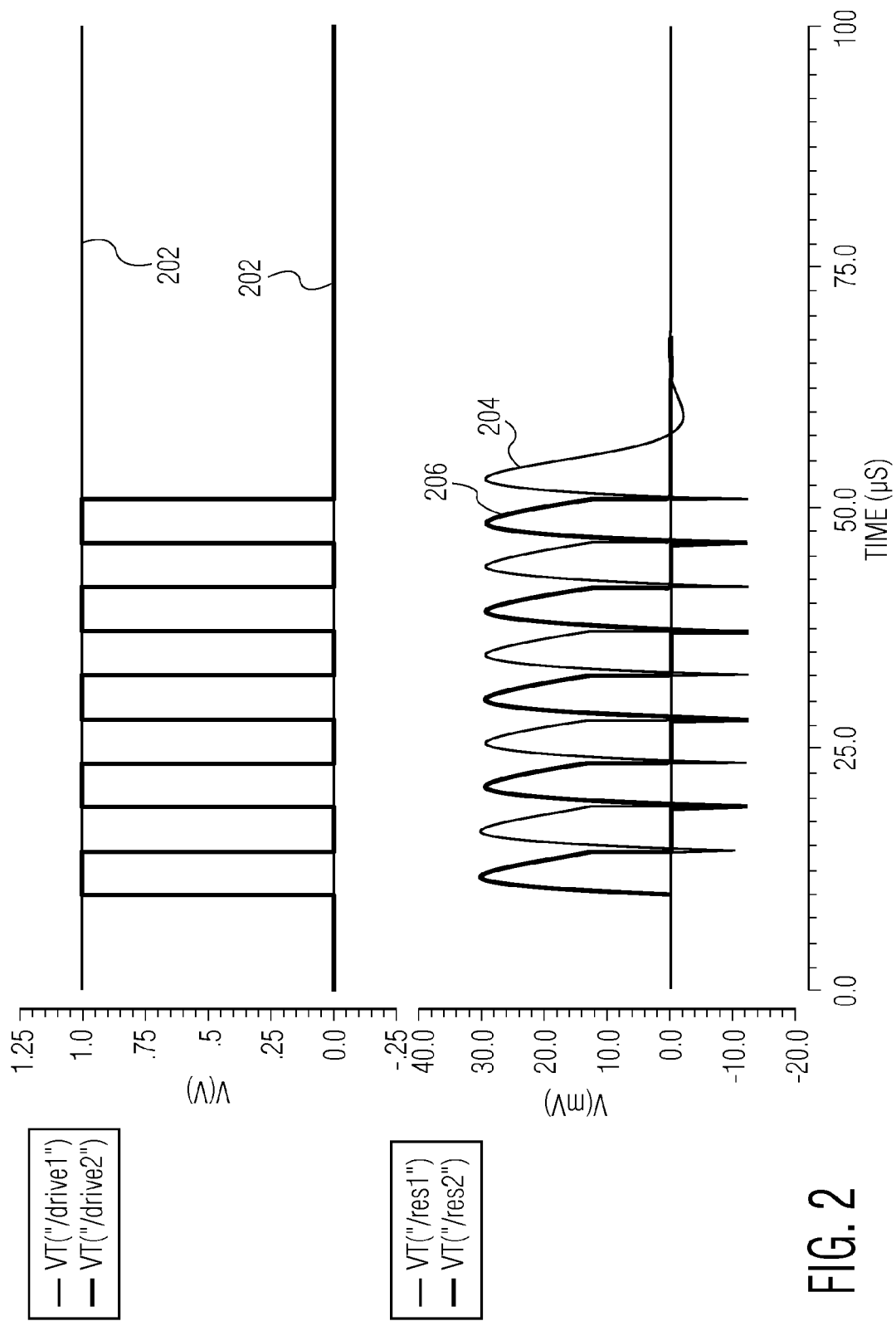
FIG. 2 is a first example graph of the inductive power supply in operation.

FIG. 2 is a first example graph of the inductive power supply 102 in operation. Ping signals 202 (e.g. the signals pwma and pwmb such as shown in FIG. 5) from driver circuit 112 charge the resonant circuit 106. The ping signals 202 are generated by turning on a transmitter in the inductive power supply 102 for a few µsec every 500 msec. Thus in this one example the inductive power supply 102 scans for presence of an object 110 for just a few µsec (e.g. 5 clock cycles) every 500 msec, and not continuously.

The resonant circuit's 106 transient response (e.g. Vres1) 204 dies down quickly after receiving the ping signals 202 since the object 110 (e.g. smartphone) is present. Such a quick decay time indicates that the resonant LC tank circuit 106 has a low Q-Factor 108. Other data shown include: Vres2 206 is 0 after ping signal pulses 202; frequency of ping=110 kHz; rise/fall=1 ns; and R-damping=5 Ohms. In other example embodiments, the ping frequency is higher or lower, for example 175 kHz. R-damping is an "equivalent resistance" of the LC tank circuit. R-damping varies with the presence of an object. Q=XL/R (XL=j*w*L). A first order effect is a change in R. A second order effect is a change in L and C. Thus it can be said that the Q-Factor 108 changes due to R.

Figure 3:
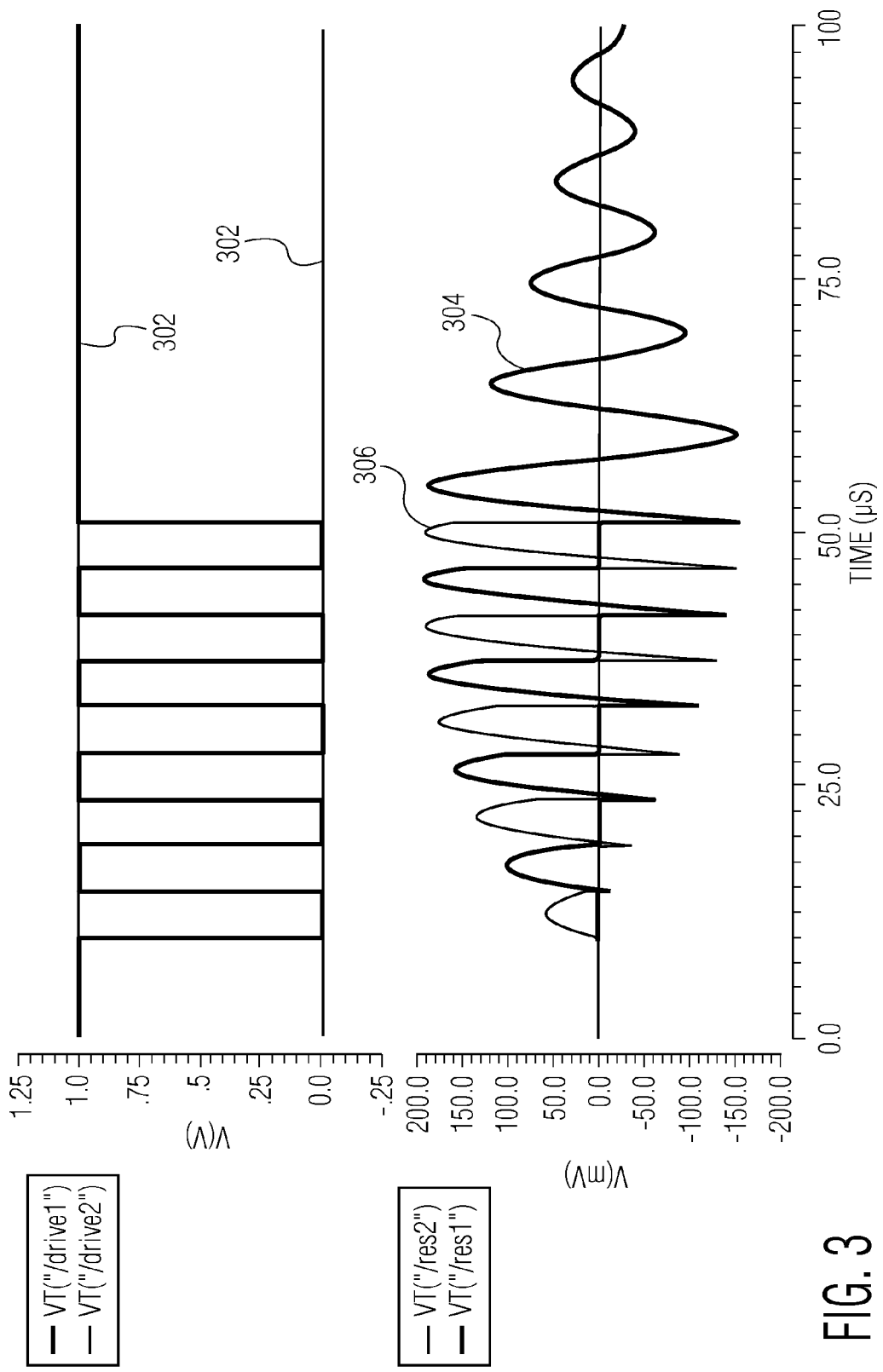
FIG. 3 is a second example graph of the inductive power supply in operation.

FIG. 3 is a second example graph of the inductive power supply 102 in operation. Ping signals 302 (e.g. pwma and pwmb) from driver circuit 112 charge the resonant circuit 106. In this Figure, the resonant circuit's 106 transient response (e.g. Vres1) 304 maintains resonance after receiving the ping signals 302 since the object 110 (e.g. smartphone) is not present. Such a slow decay time indicates that the resonant LC tank circuit 106 has a high Q-Factor 108. Other data shown include: Vres2 306 is 0 after ping signal pulses 302; frequency of ping=110 kHz; rise/fall=1 ns; and R-damping=0.5 Ohms. In other example embodiments, the ping frequency is higher or lower, for example 175 kHz.

FIG. 4 is an example object detector 116 within the inductive power supply 102. FIG. 5 is an example timing diagram of the object detector 116. FIGS. 4 and 5 are discussed together as one example operation of the object detector 116 and the inductive power supply 102.

In preparation for detecting the object 110, the controller 126 transmits a reset object detector signal at time 502, which initiates the switches (S1, S2 and S3), the clock (C) and the enable (en) for the differential amplifiers as shown in FIG. 5. Next the controller 126 send a charge resonant circuit at time 504 which causes the driver circuit 112 to ping the resonant circuit 106. The sampling circuit 118 captures peak amplitude values from the resonant circuit's 106 oscillations.

During time 506 S1 is then opened so that capacitor C1 can store/hold a first peak detected by the sampling circuit 118 (e.g. peak detector). At time 508 closing S2 transfers C1's stored charge to capacitor C3 which stores/holds a scaled version of the first peak detected. At time 510 S2 is then opened and S1 is closed so as to reset C1. When S1 is re-opened, at time 512, capacitor C1 now stores/holds the second peak detected by the sampling circuit 118. At time 514 the latch 124 is clocked so as to store the comparator 122 results.

The scaling of C3 is selected such that when the object 110 is present the second peak is less than the scaled first peak, and when the object 110 is not present the second peak is greater than the scaled first peak. Thus the comparator 122 is set to "1" if the scaled version of first peak is larger than the second peak (indicating an object is present) and is set to "0" if the scaled version of first peak is less than the second peak (indicating an object is not present). This operation is graphically shown in FIG. 6 and FIG. 7.

Additional notes: S3 is closed/high when C3 is being reset, but is open/low when C1's stored charge is transferred to capacitor C3; the controller 126 transmits a clock pulse to the latch 124 to latch the comparator 122 output before a next reset object detector signal is sent at time 516 by the controller 126 in preparation for another object-detect cycle; and the difference between the first peak amplitude and the second peak amplitude is dependent upon the Q-Factor 108 of the resonant circuit 106.

Figure 6:
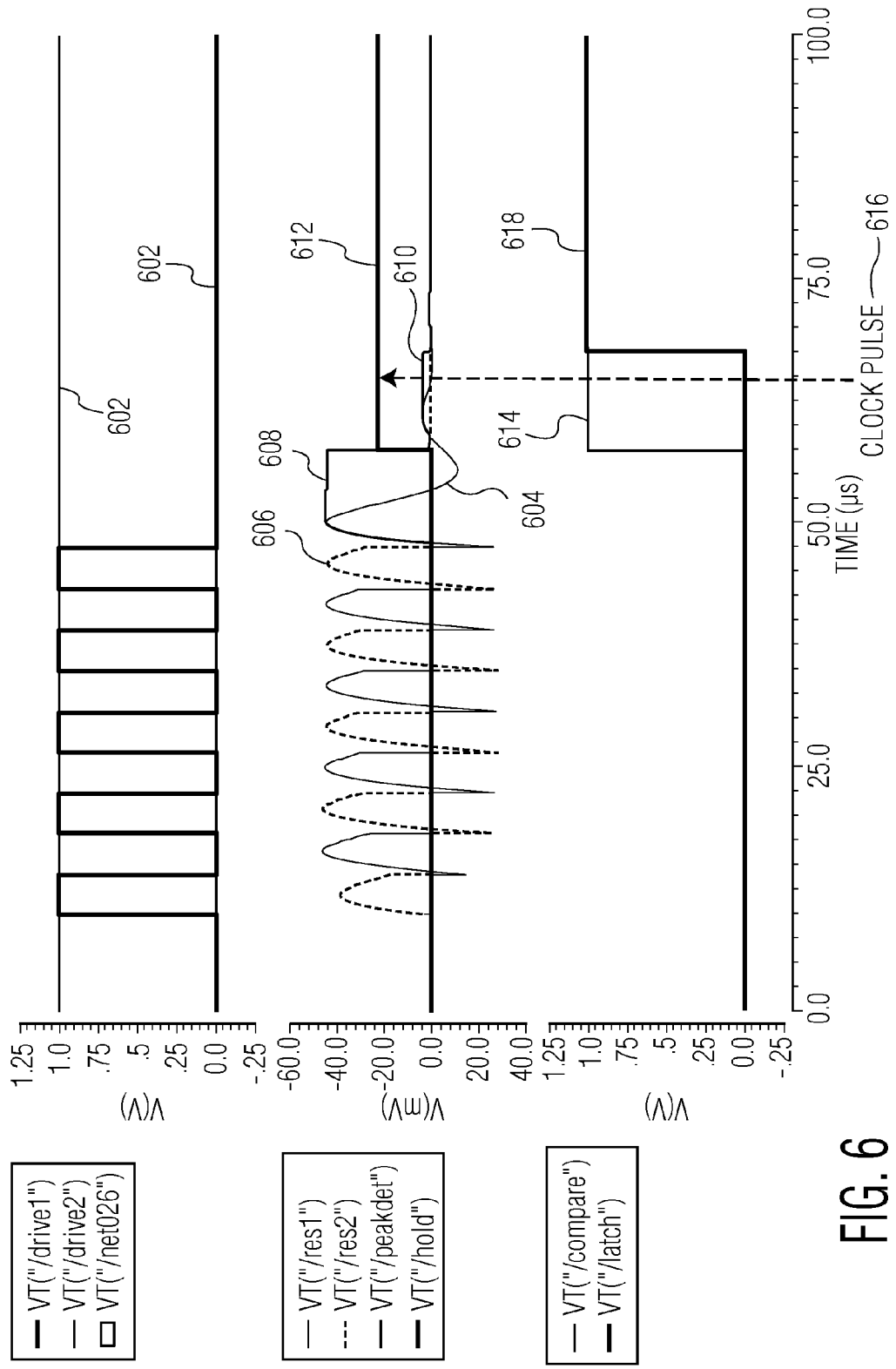
FIG. 6 is a third example graph of the inductive power supply in operation.

FIG. 6 is a third example graph of the inductive power supply 102 in operation. Ping signals 602 (e.g. pwma and pwmb) from driver circuit 112 charge the resonant circuit 106. The resonant circuit's 106 transient response (e.g. Vres1) 604 is similar to that shown in FIG. 2 (i.e. having a low Q-Factor 108) indicating that an object 110 is present. Vres2 606 is also shown.

First peak hold 608 is stored on C1 in the object detector 116 of FIG. 4. The first peak hold 608 is then transferred to C3 as a scaled first peak 612. Second peak hold 610 is then stored on C1. Since the scaled version of first peak 612 is larger than the second peak 610 the resonant circuit 106 has a high Q-Factor 108, indicating an object is present. Thus the comparator 122 output 614 is set to "1" at about 57 µsec. A clock pulse 616 is sent by the controller 126 at about 65 µsec, while the second peak 610 data is still valid, which is then latched 124 as a "1" output 618 signal at about 67 µsec.

Figure 7:
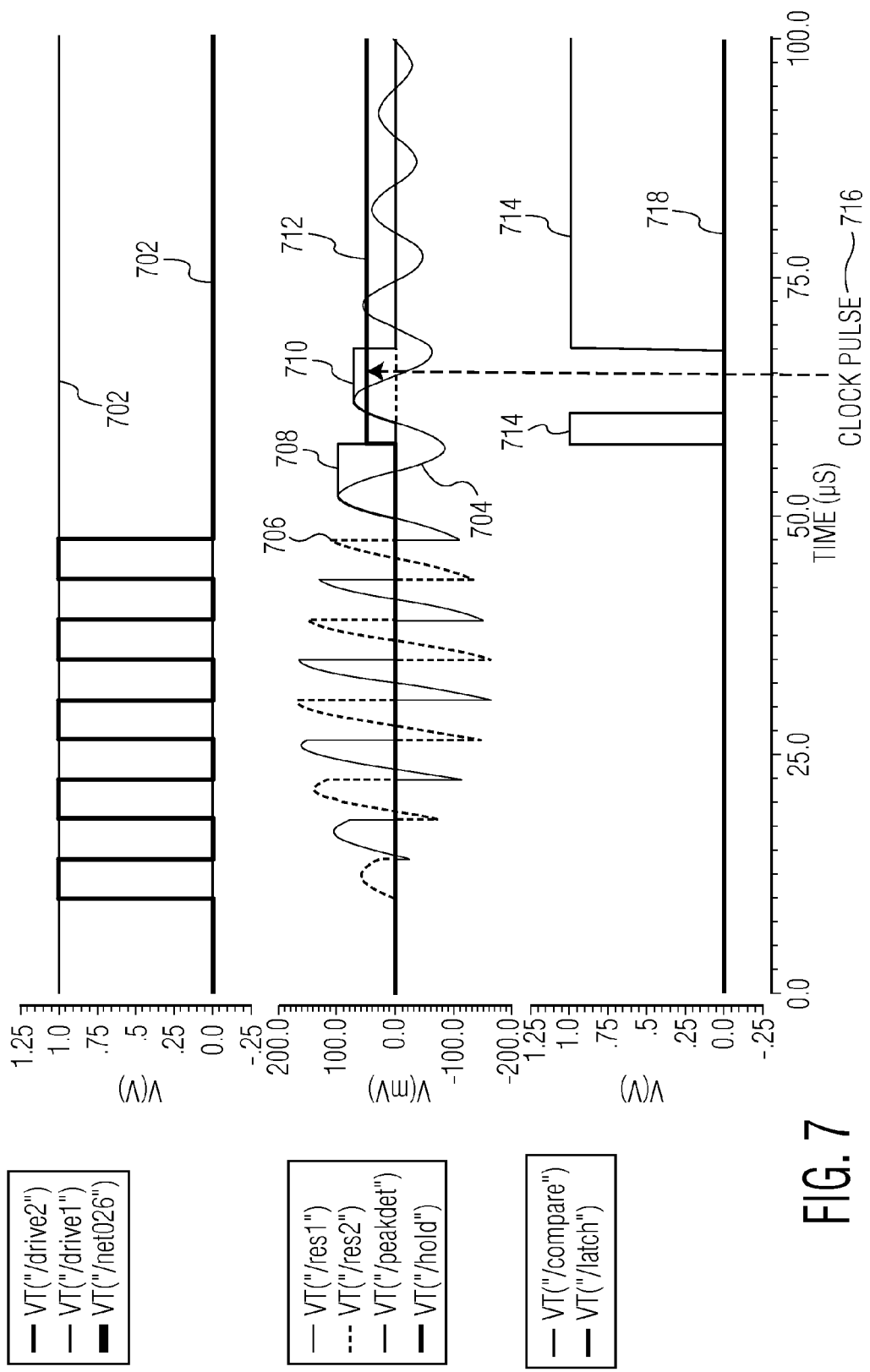
FIG. 7 is a fourth example graph of the inductive power supply in operation.

FIG. 7 is a fourth example graph of the inductive power supply 102 in operation. Ping signals 702 (e.g. pwma and pwmb) from driver circuit 112 charge the resonant circuit 106. The resonant circuit's 106 transient response (e.g. Vres1) 704 is similar to that shown in FIG. 3 (i.e. having a high Q-Factor 108) indicating that an object 110 is not present. Vres2 706 is also shown.

First peak hold 708 in this example is also stored on C1 in the object detector 116 of FIG. 4. The first peak hold 708 is then transferred to C3 as a scaled first peak 712. Second peak hold 710 is then stored on C1. Since the scaled version of first peak 712 is smaller than the second peak 710 the resonant circuit 106 has a low Q-Factor 108, indicating an object is not present. Thus while the second peak 710 data is still valid, between about 60 µsec to 68 µsec, the comparator 122 output 714 is set to "0". Thus when the clock pulse 716 sent by the controller 126 at about 65 µsec, a "0" output 718 signal is latched 124. Note that the comparator 122 output 714 is set to "1" for a time, this time was not during the time the second peak 710 data was valid.

FIG. 8 is an example of circuit diagram of a portion of the inductive power supply 102. Shown are the resonant circuit 106, R-damping, sampling circuit 118 (e.g. peak detector), store-hold-scale circuit 120, comparator 122 and latch 124. In one example of the resonant circuit 106 L=6.3 uH, C=400 nF, and when the object 110 is not present R-damping ranges from 0.2 to 0.5 Ohms, and when the object 110 is present R-damping is ranges from 1 to 10 Ohms.

Figure 9:
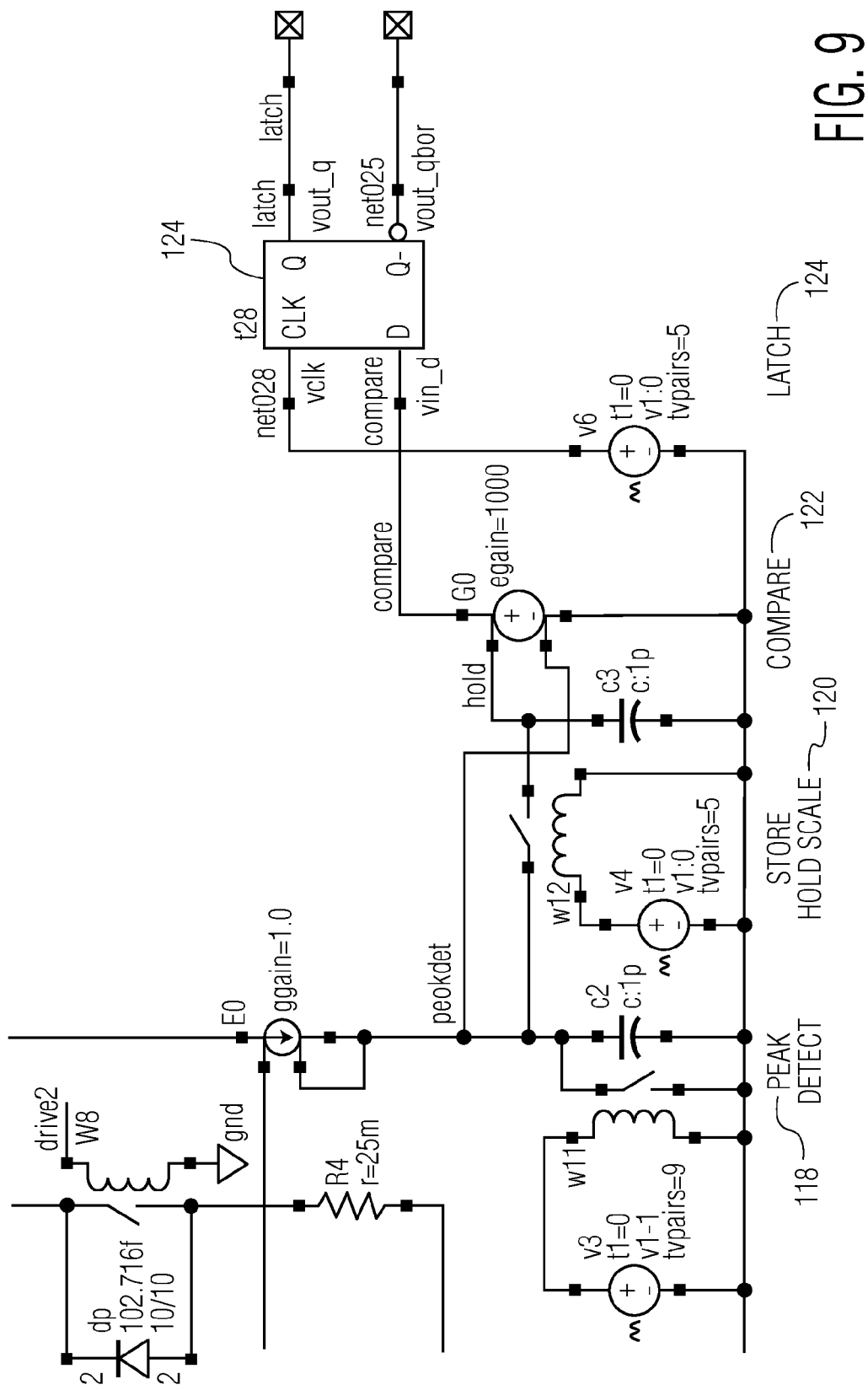
FIG. 9 is an example of circuit diagram of a portion of the object presence detector.

FIG. 9 is an example of circuit diagram of a portion of the object 110 presence object detector 116. Shown are the sampling circuit 118 (e.g. peak detector), store-hold-scale circuit 120, comparator 122 and latch 124.

FIG. 10 is a first example table of a set of operational parameters for illustrative example inductive power supply 102.

FIG. 11 is a second example table of a set of operational parameters for illustrative example inductive power supply 102. Capsel<3:0> refers to a register bit in the controller 126 for scaling capacitor C3.

FIG. 12 is a third example table of a set of operational parameters for illustrative example inductive power supply 102. The scalable capacitor C3 can be adapted to various objects 110 and applications. The scalable capacitor C3 can also be used to compensate for comparator 122 offset (i.e. trimming).

Figure 13:
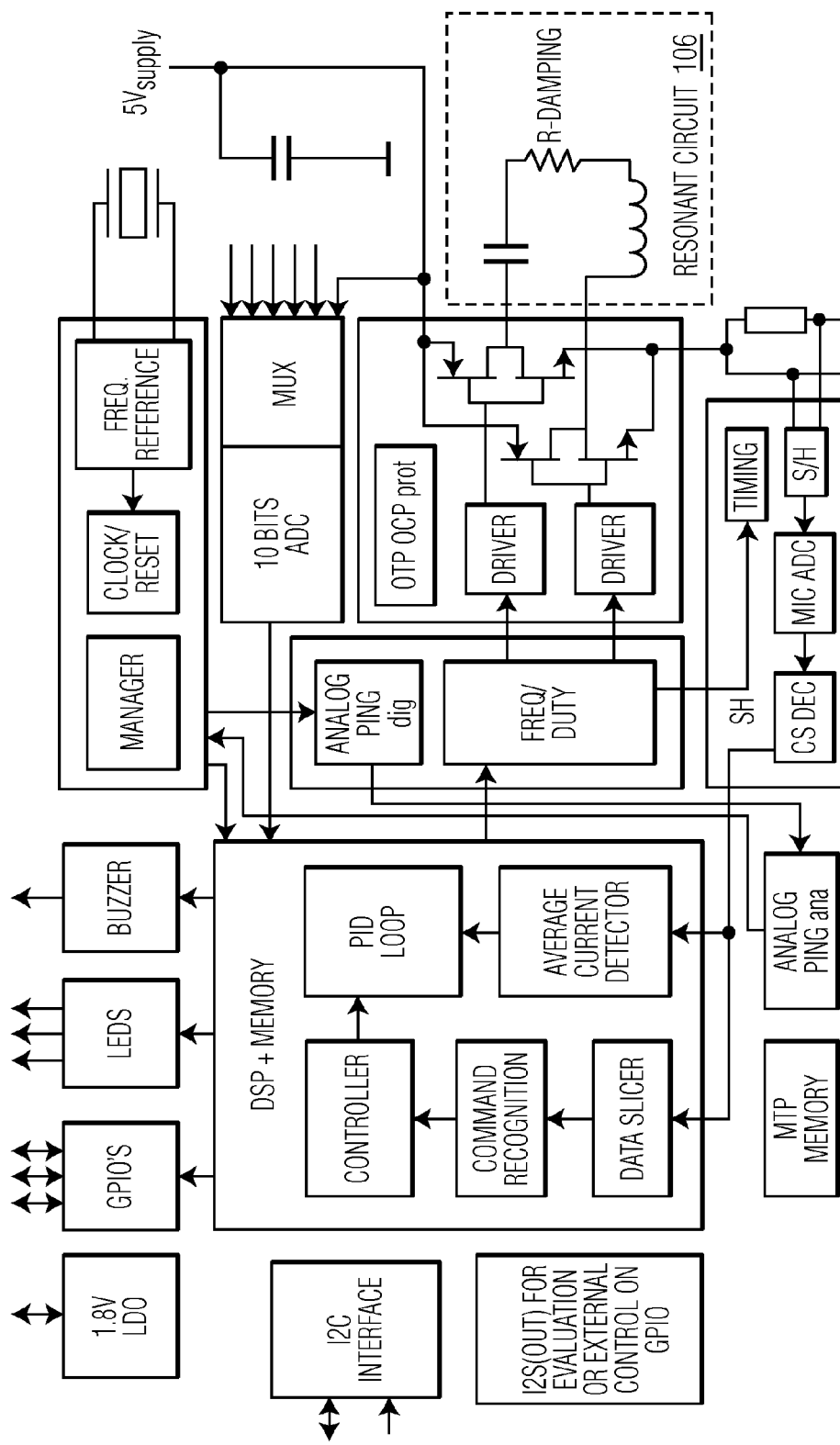
FIG. 13 is a second example inductive power supply.

FIG. 13 is a second example inductive power supply 102.

Figure 14:
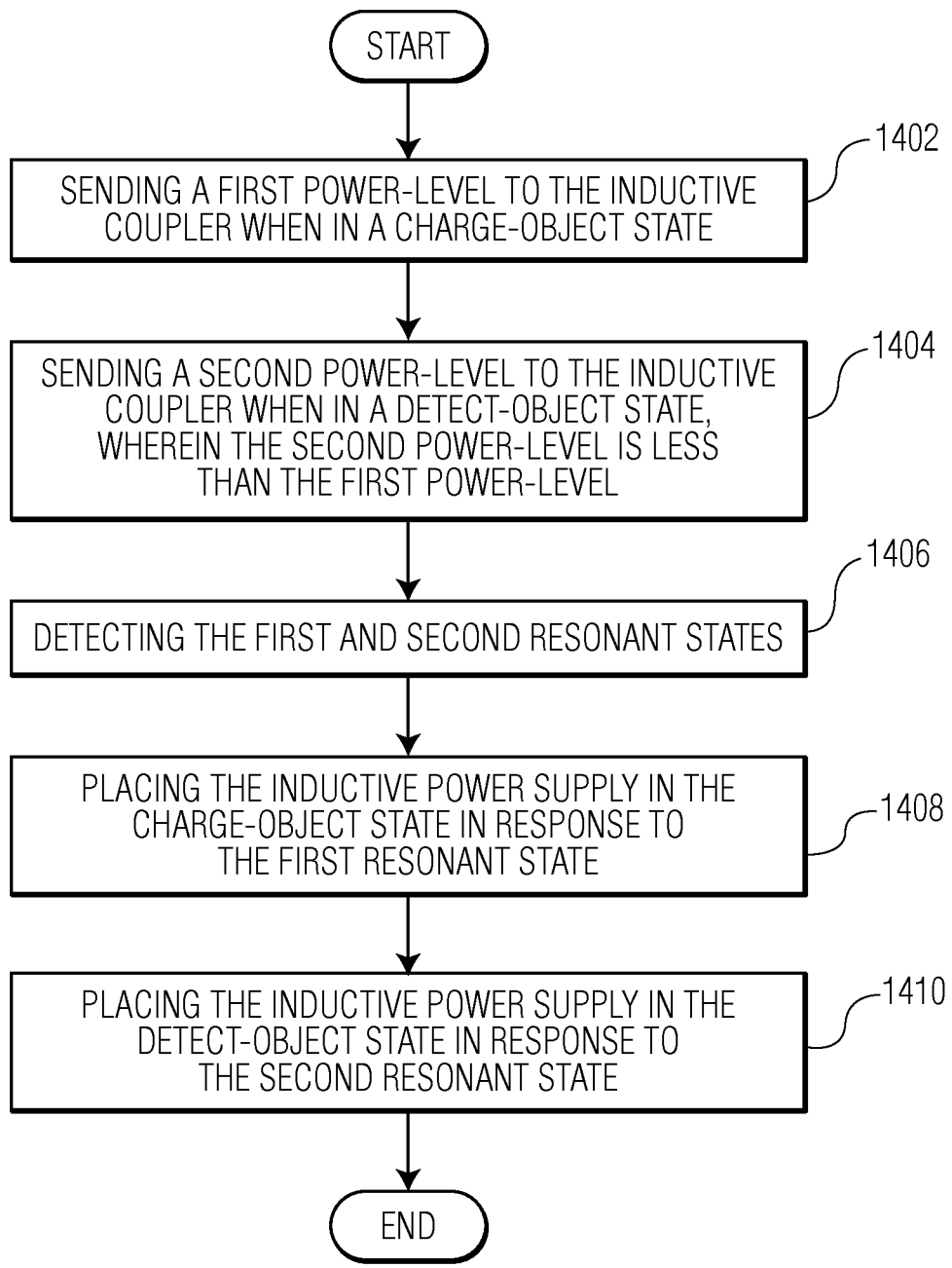
FIG. 14 is a first example set of instructions for operating an inductive power supply.

FIG. 14 is a first example set of instructions for an inductive power supply. The inductive power supply comprises an inductive coupler including a resonant circuit having a first resonant state in response to an object at a first distance from the inductive power supply, and a second resonant state in response to the object at a second distance from the inductive power supply.

The instructions begin in block 1402, by sending a first power-level to the inductive coupler when in a charge-object state. Next, in block 1404, sending a second power-level to the inductive coupler when in a detect-object state, wherein the second power-level is less than the first power-level. In block 1406, detecting the first and second resonant states. Then in block 1408, placing the inductive power supply in the charge-object state in response to the first resonant state, and in block 1410, placing the inductive power supply in the detect-object state in response to the second resonant state.

Figure 15:
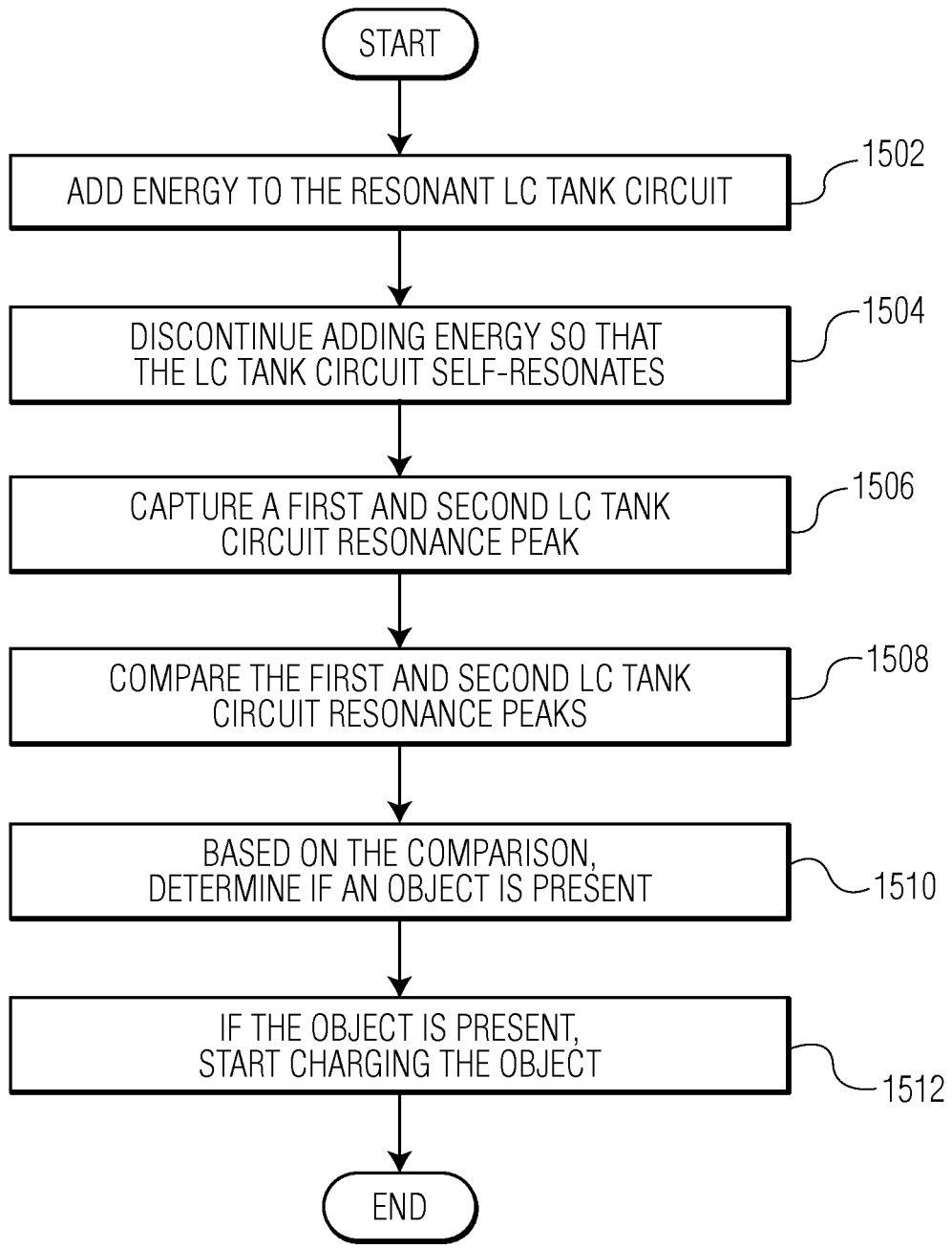
FIG. 15 is a second example set of instructions for operating an inductive power supply.

FIG. 15 is a second example set of instructions for an inductive power supply. The inductive power supply comprises an inductive coupler including a resonant circuit having a first resonant state in response to an object at a first distance from the inductive power supply, and a second resonant state in response to the object at a second distance from the inductive power supply.

The instructions begin in block 1502, by adding energy to the resonant LC tank circuit. Next, in block 1504, discontinue adding energy so that the LC tank circuit self-resonates. In block 1506, capture a first and second LC tank circuit resonance peak. Then in block 1508, compare the first and second LC tank circuit resonance peaks. In block 1510, based on the comparison, determine if an object is present. And in block 1512, if the object is present, start charging the object.

The instructions of FIGS. 14 and 15 are presented in one example order of execution, however, other orderings, such as discussed with respect to FIGS. 1 through 13, are also possible.

In some example embodiments the instructions described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the instructions illustrated herein and data and instructions associated therewith are stored in respective storage devices, which are implemented as one or more non-transient machine or computer-readable or computer-usable storage media or mediums. Such computer-readable or computer-usable storage medium or media is (are) considered to be part of an article (or article of manufacture). An article or article of manufacture can refer to any manufactured single component or multiple components. The non-transient machine or computer-usable media or mediums as defined herein excludes signals, but such media or mediums may be capable of receiving and processing information from signals and/or other transient mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs).

In one example, one or more blocks or steps discussed herein are automated. In other words, apparatus, systems, and methods occur automatically. The terms automated or automatically (and like variations thereof) mean controlled operation of an apparatus, system, and/or process using computers and/or mechanical/electrical devices without the necessity of human intervention, observation, effort and/or decision.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. An inductive power supply device, comprises:
   an inductive coupler including a resonant circuit having a first resonant state in response to an object at a first distance from the inductive power supply, and a second resonant state in response to the object at a second distance from the inductive power supply;
   a driver circuit coupled to send a first power-level to the inductive coupler when in a charge-object state and to send a second power-level to the inductive coupler when in a detect-object state, wherein the second power-level is less than the first power-level; and
   an object detector coupled to detect the first and second resonant states and place the driver circuit in the charge-object state in response to the first resonant state, and place the driver circuit in the detect-object state in response to the second resonant state.

2. The device of claim 1:
   the resonant circuit having a Q-Factor; and wherein the first resonant state corresponds to a first Q-Factor, and the second resonant state corresponds to a second Q-Factor which is different from the first Q-Factor.

3. The device of claim 1:
wherein the inductive power supply is at the first power-level when wirelessly charging the object, and at the second power-level when wirelessly detecting the object.

4. The device of claim 1, wherein the object detector includes:
a controller capable of causing the driver circuit to ping the resonant circuit;
a sampling circuit capable of sampling a transient response of the resonant circuit in response to the ping; and
a detector circuit which is capable of distinguishing the first and second resonant states based on a comparison between a first sample and a second sample of the transient response.

5. The device of claim 4:
wherein the first resonant state corresponds to a scaled amplitude of the first sample that is greater than an amplitude of the second sample; and
wherein the second resonant state corresponds to the scaled amplitude of the first sample that is less than the amplitude of the second sample.

6. The device of claim 5:
wherein the first sample is a first peak and the second sample is a second peak in the transient response.

7. The device of claim 4:
wherein the detect-object state includes ping, listen, and idle portions;
wherein the driver circuit pings the resonant circuit in the ping portion;
wherein the sampling circuit samples the transient response of the resonant circuit in the listen portion; and
wherein the driver circuit does not send pings to the resonant circuit in the idle portion.

8. The device of claim 1:
wherein the resonant circuit is an LC tank circuit.

9. The device of claim 1:
wherein the inductive coupler includes a power transmission pad having an inductive coil.

10. The device of claim 1:
wherein the object detector is coupled to place the driver circuit in both the charge-object state and the detect-object state in response to the first resonant state.

11. The device of claim 1:
wherein the object is at least one of: a smartphone, a wearable device, a medical device, and a wirelessly powered device.

12. An article of manufacture comprises at least one non-transitory, tangible machine readable storage medium containing executable machine instructions for inductive power supply which comprise:
an inductive coupler including a resonant circuit having a first resonant state in response to an object at a first distance from the inductive power supply, and a second resonant state in response to the object at a second distance from the inductive power supply; and
instructions for sending a first power-level to the inductive coupler when in a charge-object state;
instructions for sending a second power-level to the inductive coupler when in a detect-object state, wherein the second power-level is less than the first power-level; and
instructions for detecting the first and second resonant states;
instructions for placing the inductive power supply in the charge-object state in response to the first resonant state, and
instructions for placing the inductive power supply in the detect-object state in response to the second resonant state.

13. The instructions of claim 12, comprises:
pinging the resonant circuit;
sampling a transient response of the resonant circuit in response to the pinging; and
distinguishing the first and second resonant states based on a comparison between a first sample and a second sample of the transient response.

14. The instructions of claim 12:
wherein the detect-object state includes a ping state, a listen state, and an idle state;
pinging the resonant circuit in the ping state;
sampling the transient response of the resonant circuit in the listen state; and
not pinging the resonant circuit in the idle state.

15. A wireless power transmitter comprises:
an inductive coupler including an LC tank circuit having a first Q-Factor in response to an object at a first distance from the wireless power transmitter, and a second Q-Factor in response to the object at a second distance from the wireless power transmitter;
a driver circuit coupled to send a charging power-level to the inductive coupler when in a charge-object state and to send a standby power-level to the inductive coupler when in a detect-object state, wherein the standby power-level is less than the charging power-level;
a controller capable of causing the driver circuit to ping the resonant circuit;
a sampling circuit capable of sampling amplitude peaks in a transient response of the resonant circuit in response to the ping;
a first capacitor capable of storing a charge corresponding to a first amplitude peak;
a second capacitor capable of storing a charge corresponding to a second amplitude peak; and
a comparator capable of distinguishing between the first and second Q-Factors based on a comparison of the first amplitude peak and the second amplitude peak stored in the capacitors; and
wherein the controller is capable of placing the driver circuit in the charge-object state in response to the LC tank circuit having the first Q-Factor, and placing the driver circuit in the detect-object state in response to the LC tank circuit having the second Q-Factor.

* * * * *